No. 895,676. PATENTED AUG. 11, 1908.
C. PFAU.
ESCAPE VALVE FOR WATER CLOSET FLUSHING TANKS.
APPLICATION FILED SEPT. 12, 1906.

Witnesses.
Brayton C. Richards
Ada Burnett

Inventor
Charles Pfau
By James A. Ramsey
Attorney

UNITED STATES PATENT OFFICE.

CHARLES PFAU, OF CINCINNATI, OHIO, ASSIGNOR TO THE PFAU MANUFACTURING COMPANY, OF CINCINNATI, OHIO, A CORPORATION OF OHIO.

ESCAPE-VALVE FOR WATER-CLOSET FLUSHING-TANKS.

No. 895,676.  Specification of Letters Patent.  Patented Aug. 11, 1908.

Application filed September 12, 1906. Serial No. 334,236.

*To all whom it may concern:*

Be it known that I, CHARLES PFAU, a citizen of the United States, residing at Cincinnati, in the county of Hamilton and State of Ohio, have invented certain new and useful Improvements in Escape-Valves for Water-Closet Flushing-Tanks, of which the following is a specification.

My invention relates more particularly to improvements in escape valves for flushing tanks for water closets.

The construction of float valve now in general use consists of a flexible hollow rubber ball provided with a drain opening and with means for suspending it to an adjustable support and guide. In use these balls become elongated and distorted in shape and are rendered less efficient in operation than when of a substantially normal shape.

The object of my invention is to provide an escape valve which is adapted to retain its normal shape and not to become elongated and distorted.

My invention consists in providing a flexible escape valve of ordinary construction as above described with a vertical brace consisting preferably of a solid yielding piece of rubber extending across the center and thereby connecting and holding in fixed relation to each other the opposite parts of the hollow rubber or flexible ball.

Figure 1:
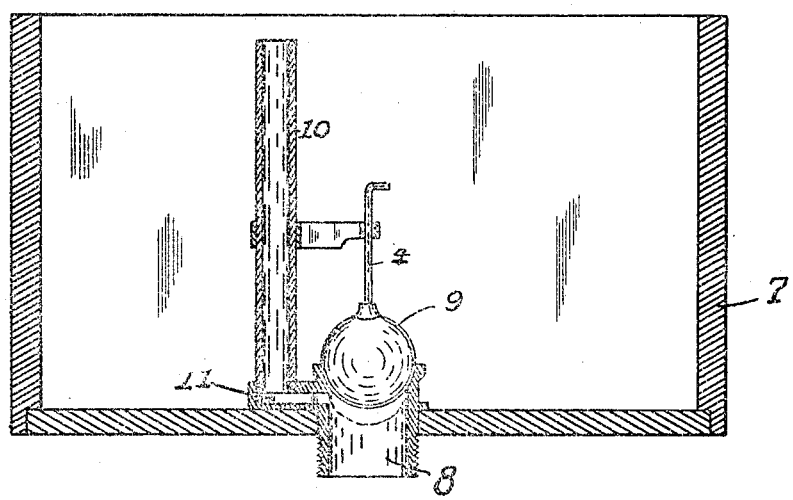
Figure 2:
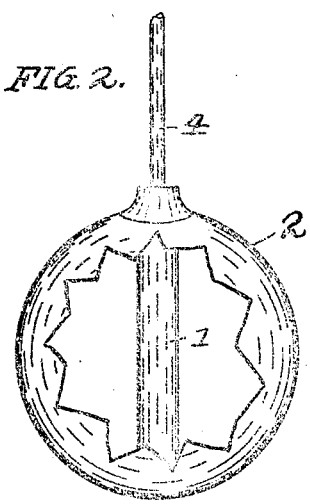
Figure 3:
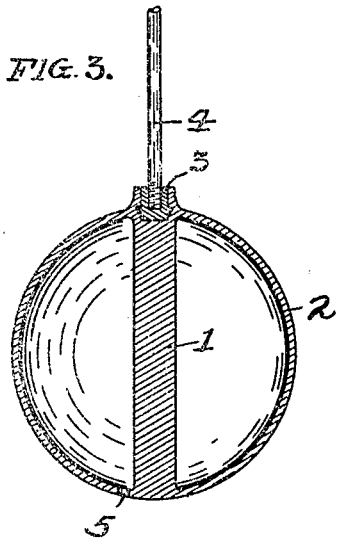

In the drawing which serves to illustrate my invention: Figure 1 is a longitudinal vertical section of a flushing tank showing the usual construction of escape valve and by dotted lines the distorted shape it assumes whereby the overflow outlet is frequently closed. Fig. 2 is a side elevation of a flexible hollow rubber ball partly broken away to show my invention applied thereto. Fig. 3 is a central vertical section of Fig. 2.

Escape valves made according to my invention are constructed preferably substantially as shown in Figs. 1 and 2 of the drawing in which a central vertical stay 1 connects the opposite upper and lower parts of the ball 2 and serves to brace and support the surface of the flexible ball valve in its normal shape. This stay 1 is preferably formed solid and made integral with the flexible rubber ball and is thus slightly yieldable, but may, if desired, be made of metal suitably secured in position and may be formed hollow. A spud or socket 3, preferably of metal, is embedded in the top part of the ball 2 at the upper end of stay 1 and is provided with means, such as a thread, to engage an adjustable guide 4 whereby said escape valve is held in its proper position with relation to the valve seat as shown in Fig. 1. The usual drain opening 5 for the discharge of any water which may get into the ball 2 is provided.

In order to more clearly set forth the advantage derived by the use of my invention I have shown, in Fig. 1, a flushing tank 7 having a flushing pipe 8 the upper end of which forms a valve seat which is provided with a flexible escape valve 9 of ordinary construction. An overflow pipe 10 communicates with flushing pipe 8 by means of passage 11 below the escape valve 9 in order to keep the tank substantially full of water without the danger of its overflowing if the inlet valve is out of order. In practice, however, it is found that a flexible ball of ordinary construction after some use becomes distorted and assumes an elongated shape and position whereby the passage 11 becomes obstructed, as indicated by dotted lines in Fig. 1, thereby causing the tank to overflow. The stay in my flexible escape valve holds said valve in its normal and proper shape, absolutely prevents the possibility of such danger and insures the perfect working of the escape valve in this respect at all times.

While I have shown a particular construction, I do not wish to be limited thereto, but claim:

1. In an escape valve for water closet flushing tanks, the combination of a hollow flexible ball valve having a vertical reinforcing stay extending centrally therein from top to bottom, with a valve seat consisting of the upper end of an open pipe, substantially as and for the purposes specified.

2. In an escape valve for water closet flushing tanks, the combination of a hollow flexible ball valve having a vertical reinforcing stay extending centrally therein from top to bottom, a drain opening in the bottom of said valve adjacent to said stay, with a valve seat consisting of the upper end of an open pipe, substantially as and for the purposes specified.

3. In an escape valve for water closet flushing tanks, the combination of a hollow flexible ball valve with a vertical stay formed integral therein and extending through the center, with a valve seat consisting of the upper end of an open pipe, substantially as shown and for the purposes specified.

4. In an escape valve for water closet flushing tanks, the combination of a hollow flexible ball valve, a stay within said hollow flexible ball valve extending longitudinally in the direction of the action of said valve, with a valve seat consisting of the end of an open pipe, substantially as shown and for the purposes specified.

5. In an escape valve for water closet flushing tanks, the combination of a hollow flexible ball valve, a yielding stay within said hollow flexible ball valve extending longitudinally in the direction of the action of said valve, with a valve seat consisting of the end of an open pipe, substantially as shown and for the purposes specified.

CHARLES PFAU

Witnesses:
 JAMES N. RAMSEY,
 GEO. A. HERRKLOTZ.